United States Patent
Gaal

(10) Patent No.: US 10,753,896 B1
(45) Date of Patent: Aug. 25, 2020

(54) APPARATUS USING CRYO-FLUID COOLED HEAT SINK TO DETERMINE THERMAL CONDUCTIVITY OF MATERIALS

(71) Applicant: Peter Gaal, Boulder, CO (US)

(72) Inventor: Peter Gaal, Boulder, CO (US)

(73) Assignee: ARRIGO ENTERPRISES, LLC, Boulder, CO (US)

( * ) Notice: Subject to any disclaimer, the term of this patent is extended or adjusted under 35 U.S.C. 154(b) by 0 days.

(21) Appl. No.: 16/783,549

(22) Filed: Feb. 6, 2020

Related U.S. Application Data

(60) Provisional application No. 62/921,674, filed on Jul. 1, 2019.

(51) Int. Cl.
| | | |
|---|---|---|
| G01N 25/18 | (2006.01) | |
| G01K 3/00 | (2006.01) | |
| G01K 7/00 | (2006.01) | |
| G01K 1/00 | (2006.01) | |

(52) U.S. Cl.
CPC ................... *G01N 25/18* (2013.01)

(58) Field of Classification Search
USPC ............................ 374/44, 166, 141, 208, 183
See application file for complete search history.

(56) References Cited

U.S. PATENT DOCUMENTS

| | | | | |
|---|---|---|---|---|
| 3,263,485 A * | 8/1966 | Mahmoodi | ............ | G01N 25/18 374/44 |
| 3,521,476 A * | 7/1970 | Day | ...................... | G01N 25/18 374/44 |
| 3,733,887 A * | 5/1973 | Stanley | ................... | G01N 25/18 374/44 |
| 6,142,662 A * | 11/2000 | Narh | ...................... | G01N 25/18 374/29 |
| 6,331,075 B1 * | 12/2001 | Amer | ...................... | G01N 25/18 374/44 |
| 6,742,926 B1 * | 6/2004 | Fesmire | ................. | G01N 25/18 374/34 |

(Continued)

OTHER PUBLICATIONS

Booher, J., "How Cooling with CO2 Works", webpage (Nov. 2019), Total Temp Technologies, Inc., 3630 Hancock St. A, San Diego, CA 92110, USA, www.totaltemptech.com/how-cooling-with-CO2-works/.

(Continued)

*Primary Examiner* — Mirellys Jagan
(74) *Attorney, Agent, or Firm* — Rick Martin

(57) ABSTRACT

The invention relates to equipment for measuring the thermal conductivity of solid materials in the −50 C to 350 C temperature range, using an improved form of the Guarded Heat Flow Meter Method. The unknown material specimen is subjected to the temperature gradient which is induced by electrically heating from one end and cooling the other end. In intimated contact with the unknown on either ends are pieces of a well characterized material which are clamped together by an electromechanical actuator via a calibrated compression spring, with the extent of the compression indicated by a linear displacement transducer. The heat sink is formed with an internal cavity into which liquid carbon dioxide is injected through a capillary in a controlled fashion. This allows operating the heat sink in the entire temperature range without interruptions and the need for thermal spacers.

19 Claims, 5 Drawing Sheets

(56) References Cited

U.S. PATENT DOCUMENTS

| | | | | |
|---|---|---|---|---|
| 6,896,405 | B2* | 5/2005 | Osone | G01N 25/18 374/43 |
| 7,445,379 | B2* | 11/2008 | Chang | G01N 25/20 374/142 |
| 2010/0318316 | A1* | 12/2010 | Fesmire | G01N 25/18 702/136 |

OTHER PUBLICATIONS

Brochure for "ECO-LT Freezing Tunnel", CES, Inc., 11959 Tramway Dr., Cincinnati, OH 45241, USA, www.cesgroup.com/en/education/cryogenic-freezing.

Brochure for "EC and ET Series Chambers", Sun Electronic Systems, Inc. (Jan. 2020), 1845 Shephard Dr., Titusville, FL 32780, USA, www.sunelectronics.com/Temperature-Chamber-Comparison-Tables.

Brochure for "Standard and Custom Thermal Chambers", Sigma Systems Corp., 41 Hamden Rd., Mansfield, MA 02048, USA, www.intestthermal.com.

Brochure for "Ser 9000 Environmental Chambers" (Jan. 2020), Cohu, Inc., 12367 Crossthwaite Cir., Powey, CA 92064, USA, www.cohn.com/chambers.

Brochure for "GHFM-02 Guarded Heat Flow Meter", Thermtest, Inc., 34 Melissa St. #1, Fredericton, NB, Canada E3A 6W1, https://thermtest.com.

Brochure for "GH Series Steady Method Thermal Conductivity Measurement", Advance Riko, Inc., Esakacheon, Suita-shi, Osaka 564-0063, Japan, www.advance-riko.com/en/products/gh-1.

Brochure for "HFM Heat Flow Meter", Linseis Messgerate GmbH, Viersitzer Str. 43, Selb 95100, Germany, www.inseis.com/en/produts/thermal-diffusivity-thermal-conductivity.

Patenaude, Andre, "CO2 as a Refrigerant—Properties of R744", Emerson Climate Technologies, 150 Emerson Bypass Rd., Russelville, KY 42276, USA, www.EmersonClimatetechnologies.com/2015/05/14/Co2-as-a-refrigerant.

Bomberg, M. et al, "Analysis of Uncertainties in Calibration of Heat Flow Meter Apparatus", in Proceedings of Thermal Conductivity 18, 1983, pp. 259-272, DESTech Publications, Inc., Lancaster, PA, USA.

ASTM International, 100 Barr Harbor Dr., West Conshohocken, PA 19428-2959, USA publication, with respective standard designation: C518, Test Method for Steady-State Thermal Transmission Properties by Means of the heat Flow Meter Apparatus.

ASTM International, 100 Barr Harbor Dr., West Conshohocken, PA 19428-2959, USA publication, with respective standard designation: E1530-19, Standard Test Method for Evaluating the Resistance to Thermal Transmission of Materials by the Guarded Heat Flow Meter Technique.

Jacobs-Fedore, R. A., Stroe, D. E., Thermophysical Properties of Vespel™ SP1, in Proceedings of Thermal Conductivity 27 / Thermal Expansion 15, 2004, pp. 231-238, DESTech Publications, Inc., Lancaster, PA, USA.

Williams, I., Shawyer, R. E., "Certification Report for Pyrex Glass Reference Material for Thermal Conductivity between -75 C and 195 C", Commission of the European Communities Report CRM039 (EUR 13358), National Physical Laboratory, Teddington, UK, 1991.

Stroe, D. E., Thermitus, M.- A., Jacobs-Fedore, R. A., Thermophysical Properties of Pyroceram# 9606, in Proceedings of Thermal Conductivity 27 / Thermal Expansion 15, 2004, pp. 382-390, DESTech Publications, Inc., Lancaster, PA, USA.

Powell, R. W., Ho, C. Y., Liley, P. E., Thermal Conductivity of Selected Materials, Special Publication NSRDS-NBS8, 1964, National Bureau of Standards, Washington, DC, USA.

Brochure for "Unitherm# Model 2021 Thermal Conductivity Measuring System", Anter Corporation, 1700 Universal Road, Pittsburgh, PA 15235, USA.

Brochure for "Unitherm™ Model 2022 Guarded Heat Flow Meter Thermal Conductivity Measuring System", Anter Corporation, 1700 Universal Road, Pittsburgh, PA 15235, USA.

Brochure for "DTC-300 Thermal Conductivity Meter", TA Instruments, 159 Lukens Dr., New Castle, DE 19720, USA. Product sheet 1.5.2020, www.tainstruments.com/wp-content/upload/DTC-300-2015.pdf.

Brochure for "Guarded Heat Flow gfh-01", Accu Instruments, First Floor Telecom House, 125-135 Preston Road, Brighton, England, BN1 6AF, www.accuinstruments.com.

Brochure for "Fox 50 Heat Flow Meter", Jan. 15, 2020, TA Instruments, 159 Lukens Dr., New Castle, DE 19720, USA, www.tainstruments.com/wp-content/upload/BROCH-LC-2015-EN.pdf.

Brochure for "SD/BHD series chambers, BD series chambers, and Walk-in Rooms", Associated Environmental Systems, 8 Post Office Square, Acton, MA 01720, USA, www.associatedenvironmentalsystems.com/chambers.

* cited by examiner

APPARATUS USING CRYO-FLUID COOLED HEAT SINK TO DETERMINE THERMAL CONDUCTIVITY OF MATERIALS

CROSS REFERENCED PATENTS

This non-provisional application claims priority to provisional application No. 62/921,674 filed Jul. 1, 2019 which is incorporated herein by reference in its entirety.

BACKGROUND

Thermal conductivity is a property of every material, indicating the extent to which it conducts heat. Heat will always flow from the hot environment to the cold one, in an attempt to equalize the temperature difference. Placing a section of material between a hot and a cold heat sink will control the flow by the test material's inherent thermal resistance. (Thermal resistivity is the inverse of thermal conductivity.) This flow is quantified in terms of a heat flux, q, which is the heat rate, Q, per unit area, A, through which the heat flows in the given direction. In all materials, q is proportional to the temperature difference ΔT and inversely proportional to the thickness, L, according to equation (1):

$$q = -k \Delta T / L \qquad \text{Equation 1}$$

where k is the proportionality factor that varies with temperature for most materials. This relationship, in its generalized form, is defined by Fourier's Law of heat conduction, and k is referred to as thermal conductivity. To determine k as a function of temperature for a particular material, a specimen of the material of known thickness and uniform cross sectional area is subjected to a thermal gradient, and the amount of heat transported is measured by some means. In reality, this process is very complex, due to the need to ensure a unidirectional heat flow (no radial losses or gains along the flow path), and the difficulties in measuring the quantity of heat passing through the specimen.

The thermal conductivity varies nonlinearly with temperature for all materials, therefore it must be measured over the range of use.

Thermal conductivity is an intrinsic property of each material. It can range from several thousand W/(m·K) (diamond) to five decades lower (aerogel). Because of this enormous range, there is no single method of measurement that can be used for all. While there is no strict division based on thermal conductivity, it is common practice to refer to a material as being of high conductivity with k>40 W/(m·K), medium conductivity 2<k<40 W/(m·K) and low conductivity 0.1<k<2 W/(m·K). Below 0.1 W/(m·K) they are called insulators. The Guarded Heat Flow Meter is most useful for testing medium and low conductivity materials. It is not appropriate for either high conductivity materials or insulators.

A commonly employed configuration described in literature and used in commercially available instruments is depicted in FIG. 1. It consists of a stack of layers S, where the unknown 1U is sandwiched between a heater plate 2H and a heat sink 3S. To avoid having to drill or groove into the unknown test specimen, for placing in temperature sensors, like thermocouples, in some cases, a layer 4 of very high conductivity material, such as copper, silver or aluminum, is interposed with suitable cavities, C, for said temperature sensors 5T (FIG. 1). The heater plate 2H contains a heat source 6H, which is most often an electrically heated resistance wire. The use of other means, such as thermoelectric heaters, circulated steam and radiation sources have been also described.

For equation 1 to apply, only the heat flow along the axis of stack S must be considered. Since heat will propagate in all directions along temperature gradients that exist, methods have been implemented and codified, such as described in ASTM E1530-19, to deal with minimizing the effects of these extraneous heat paths. In this "Standard Test Method for Evaluating the Resistance to Thermal Transmission of Materials by the Guarded Heat Flow Meter Technique", a dimensionally defined and of well characterized thermal conductivity piece 7 is placed in series with the unknown specimen, 1U, in the path of the axial heat flow (Q1). In principle, temperature sensors could be placed directly into this section at well defined intervals, to determine the temperature gradient along it, but in practice, using heat spreader plate 4 is more common. Applying Equation 1 to this section, the heat flow Q1 will be defined from ΔTR=T4−T3, having all other terms known. FIG. 3 shows temperatures with an arrow such as T3, T4. FIG. 4 labels item 3050 as the pressure generator. Using the thusly determined Q1, when substituted back in Equation 1 for the unknown specimen 1U and using ΔT=T2-T1, will yield its thermal conductivity, as long as Q1 is constant while passing through the stack. In reality, it will not be so, as its environment is at different temperatures (T4>T3>T2>T1) along its axis. Theoretically, if one places a guard cylinder 8G around the stack and produces an axial gradient along this cylinder exactly matching that of the stack, radial losses/gains (Q4, Q5, Q6) would be zero. However, this is nearly impossible, so a compromise is commonly used where the guard is kept at some mean temperature of the unknown, the metering section, or the combination of the two, to minimize and balance parasitic radial heat flow (Q4, Q5, etc.). A novel part of the invention addresses this issue. Furthermore, calibration procedures are also used, using well characterized reference species and defined testing protocols, to quantify the combined losses. It is imperative that calibration protocols be identical to testing protocols, including clamping pressures, guard positioning and guard temperatures.

Unavoidable barriers in the path of heat flow are thermal interfaces. They produce thermal interface resistances on either sides of the unknown specimen 1U and of the reference section. These are kept as constant as possible by the application of thermal grease or other similar means, FIG. 3 210,211.

The components of the stack S are compressed together usually with pneumatic cylinders, or fully compressed springs.

The final component in the stack S is the heat sink 3S, usually cooled with tap water or refrigerated water, circulated through cooling coils or channels. In some instances, thermoelectric coolers were used successfully. In nearly all cases, however, this type of heat sink becomes a limiting factor in realizing higher temperatures.

Thermal conductivity of most materials varies with temperature. In order to assign a single number to any discrete temperature, it is necessary to measure it in a temperature range straddling the discrete point. It is physically impossible to measure thermal conductivity with this range being zero, as there is a need to establish a finite and reliably measurable thermal gradient. However, the wider this gradient, the further the calculated value based on the measurement will deviate from the true value. As a practical matter, ranges of 10 C to 30 C are used. This necessitates having the heat sink 3S at a high temperature when high temperature measurements are being made. In form of example, an upper heater block 6H temperature of 300 C necessitates a heat sink 3S temperature of at least 270 C. This is not possible to achieve with water cooled heat sinks, as water will boil at 100 C. So, current instruments employing the method, have been equipped with a removable spacer made of low conductance material which is switched out for the low end region, T<80 C, and then installed for temperatures above. This necessity virtually denied the possibility of an uninterrupted and continuous test protocol, to cover sub ambient to well elevated (up to and above 100 C heater), employing 30 C total heater to heat sink temperature differences. The present invention eliminates the need for such a spacer, by virtue of allowing the heat sink to float up to the desired temperature, not far below the heater, and thus affording a single uninterrupted test protocol for a wide range of temperatures.

To compress the stack and the unknown, most commonly, a pneumatic cylinder is used, fed from an adjustable pressure regulator. While this is straightforward, its limitations are many. Pneumatic cylinders have a certain drag from the seals, so they tend not to move until air pressure builds up and, therefore, the adjustment is very coarse. This is detrimental, especially at low pressures, when used for deformable specimens.

The other commonly employed means is a simple spring that is compressed with a suitable lever until it locks. This method works well for specimens of the same thickness, but will usually vary the compressive force for varied specimen thicknesses.

The present invention remedies many of the above detailed problems associated with this measurement technique, and it also provides a path to extend the measurement capabilities to include modulated and programmed pressures to be included in testing protocols.

SUMMARY OF THE INVENTION

In general, the present invention deals with a guarded heat floor meter thermal conductivity (thermal resistivity) measuring instrument (TCM) 3000,3050 FIG. 3, and FIG. 4 with novel features to extend operating range, operating stability, ease of operation, aimed at producing more accurate data than devices used for the purpose in prior art.

For convenience, a vertical assembly is described with the heater on top. This is by no means restrictive, and any orientation may be used. The following refers to FIGS. 2 through 5.

The TCM is constructed of a copper top heater block 24 equipped with an electric heater 26 which is set to a desired temperature and held there using a Novusm N1020 (or similar) PID temperature controller (not shown), fed signals from an RTD 27 temperature sensor placed adjacent to the heater 26. Below in the block is a high sensitivity and high accuracy class A signal generating RTD 25, having a nominal resistance of 100 to 2000 ohms. Brazed 201 to the copper block is a 304 (or similar grade) stainless steel section, whose thickness is selected to be approximately at mid-point of the operational thermal resistance range, in our case 1.25 in. The other face has a heat spreader copper disk brazed 202 on, housing another signal RTD 124. This assembly is referred to as the upper stack USA.

A similarly constructed lower stack LSA, consisting of a heat spreader plate 17, brazed 203 to a 304 stainless steel section of 0.5 in thick lower reference, which is in turn brazed 204 to another heat spreader 12 with another signal RTD 15 in it. This lower stack is then firmly mounted on top of the heat sink 9 with several layers of pyrolytic graphite foil 11, having a total thickness up to 0.1 inch in between. The unknown specimen 20 is clamped between these two stacks.

The heat sink consists of an elongated cavity made up of a copper upper half 9 having multiple internal fins, and a stainless steel lower half 8 that has a large, 1 inch diameter unimpeded exit port 36 to the atmosphere. This provides an essentially open cavity, not a confined passage way. Liquid carbon dioxide (LCO2) is injected into this cavity through a capillary 37, as needed. Additionally, another heater 13 with its associated controller (not shown) and control RTD 14 is embedded in the copper assembly 12 of the heat sink, to provide for increasing the temperature of the heat sink. The LCO2 flow is controlled by a separate controller (not shown) responding to a separate control RTD 112 in the copper upper heat sink section. The flow of the LCO2 is controlled by a solenoid valve 35.

The unknown specimen 20 is clamped between the two stacks, using novel positioning rings 19 and 21 to assure concentricity. The compressive force to clamp the stacks is supplied by an electromechanical actuator 31, capable of up to 5 in stroke and 1000 lbf force exertion. The current embodiment employs a 2 in stroke and 200 lbf maximum actuator, to generate up to 60 psig pressure on a 2 in diameter stack. The actuator is equipped with an internally coupled position transducer 32, in this case a 10 Kohm linear potentiometer.

Between the actuator and the gimbal suspension 28 and 125 of the upper stack, is a compression spring 30 of well known spring constant. After the unknown specimen is in place, a "zero force touch" position is established, using a series of computer controlled short strokes (<0.05 in), each producing a corresponding force value. From this, a "0" force point is computed and the actuator is withdrawn to it. All further spring compressions from this point, represent corresponding loads, defined by the position transducer. Additionally, a secondary force transducer is embedded under the spring 33, to co-witness the "0" force point, as well as the achieved load.

The unique and novel loading mechanism described above, with controlled force and compression monitoring, in conjunction with the controlling digital program, allows operating modes never realized in an instrument constructed for measuring thermal conductivity according to prior art, and interface thermal resistance (or combination thereof). In prior art, pneumatic cylinders are used to generate this pressure, which are very sluggish and difficult to produce reliable force with. Having the actuator press upon a spring ensures that the force on the target interface is what is expected. Furthermore, this force may be changed at will during loading, or during an actual test simply by compressing or relaxing the load spring with the actuator. The largest impact of this novel element is on testing films or compound used as thermal conductors between interfaces, where knowledge of accurate pressure or oscillation of pressure mimicking the thermal cycling of a semiconductor, is of paramount importance. Furthering this knowledge is the novel testing modes that allow, as an example, but not limited to, stepwise increase of pressure on a sample at a sequence of equilibrium temperatures, a linearly ramped pressure, a sequence of equilibrium temperatures, a periodical (such as sinusoidal, square or triangular wave) modulated pressure at a sequence of equilibrium temperatures, or combination thereof, and cyclic endurance tests, all while producing corresponding thermal conductivity data.

The stacks are surrounded by a sliding guard furnace 34 consisting of an outwardly insulated 33 aluminum tube 34, having a gap of approximately 0.125 to 0.25 inch between it and the stack. The guard has its own heater and cooling chamber 126 fed liquid $CO_2$ through capillary 127 and control RTD and temperature controller (not shown). Liquid $CO_2$ is metered by control valve 128, and $CO_2$ gas exits through port 129, FIG. 2.

Single column or multiple column configurations are envisioned. The present configuration consists of two columns side by side, with independently controlled thermal cycles.

It is possible to operate the instrument according to the test protocol and analysis described by the cited ASTM standard, whereupon the data from the lower stack is simply ignored. Other operating modes are also envisioned, for example one afforded by having the novel lower reference section, a loss minimizing protocol described below.

It is clear from FIG. 3 that having no net loss/gain along the column dictates the measured flux through the upper gauge section 23 and the lower gauge section 16 be nearly equal. This condition can be promoted by a judiciously placed guard (34 in FIG. 2), held at a temperature where such an equilibrium exists. This protocol includes first heating the top heater block 24 to temperature T5 and the bottom heater block to a temperature T1, generating a desired gradient, let's say 30 C between T2 and T5. T3 is assumed to be equal to T4. At this point, constancy of flux is evaluated by monitoring q(r1), which is the heat flux passing through the lower gauge section 16 and q(r2), which is the flux passing through the upper gauge section 23. While monitoring the ratio of q(r1) and q(r2) and comparing it to a ratio dictated by the known construction figures, the guard temperature is slowly increased, in steps. When the desired ratio is closely approximated, a minimal loss condition is declared.

k is then calculated using q(s)=[q(r1)+q(r2)]/2.

All other aspects of the basic protocol described are retained. As an example, we have heated the top heater to close to 215 C and set the heat sink temperature to 150 C, which yielded a mean unknown specimen temperature of 185 C. In this example, the upper metering section was not identical to the lower metering section, but had a 1.6:1 ratio of thermal resistances, respectively. Thus, in thermal equilibrium, with no net heat gain/loss, the temperature drop across them will be the inverse of this ratio. With losses/gains, the inverse ratio will be some other value. Starting from a guard temperature of, let's say, 15 C below the mean temperature of the unknown, temperature readings were taken via the in-place temperature sensors, and the inverse ratio calculated. As expected, it was not the predicted value. At this point, the guard temperature raised 5 C and after reaching thermal equilibrium, the inverse ratio was computed. As the steps progressed, the inverse ratio converged toward the predicted value, and then began to diverge. From the convergence/divergence relationship, the guard temperature at which the computed and predicted values are the same, was determined. This procedure and operating mode provides testing unknown material specimens more accurately, as proved by results obtained in well characterized reference materials, such as Pyroceram* 9606, Pyrex* and Vespel** SP-1. (Trademarks of: * Corning, Inc., Corning N.Y., USA, and ** E.I. DuPont & Co., Wilmington Del., USA).

While other cryogenic liquids are available and have been used with limited success (LN2, for example) and each provides cooling phase transformation (extracting the heat of evaporation from the environment), their use is generally cumbersome and inefficient. The coolant the invention embraces specifically is liquified carbon dioxide (CO2 in liquid form). This coolant has been successfully used in cooling large volumes of environmental chambers by spraying it into the load space directly, and allowing for full evaporation. Due to the complex phase transformation process, LCO2 kept at pressures greater than 800 psi in a cylinder at ambient temperature, forms a solid upon being sprayed into the cavity and rapidly reaching atmospheric pressure, forming dry ice, which then readily sublimates. The thermal efficiency of this coolant is very high due to this double phase transformation. The resulting gas phase after the phase transformation is at or close to the transformation temperature, therefore it represents even further cooling of the heat sink surface. Using an open to the atmosphere cavity instead of confined passages, the formed gas is free to expand without hindering the controlled injection of liquid spray and the handling of dry ice, thus being able to operate at wall temperatures well above the boiling point of the coolant liquid spray.

Liquid CO2 has been employed often in cooling environmental chambers of varying sizes, food freezing machinery such as Multi-pass Tunnel Freezers. LCO2 is also known as R-744 Refrigerant.

The heat sink 8 and 9 of the embodiment of the invention is cooled by controlled injection of liquid carbon dioxide (CO2). When the liquid spray 55 enters the atmospheric pressure cavity, it transforms into particles of solid CO2 (dry ice) 56, which rapidly sublimate into gaseous CO2, while adsorbing a large amount of heat from the cavity walls. The novelty of this as it is related to this specific application that is the measurement of thermal conductivity of materials, is having such a gas cooled heat sink, it is not limited the way liquid or, more specifically, water cooled heat sinks, which are used nearly exclusively in current art limited to a maximum temperature well below the boiling point of water. Some current use of thermoelectric cooling also have similar temperature limitation. The current invention allows the gas cooled heat sink to float up in temperature to maintain the desired 30-40 C temperature difference (desired gradient region) between the uppermost and lowermost sensors. Testing in the range of −50 to 350° C. is possible.

The embodiment of the invention includes the use of layers of pyrolytic carbon or graphite foils 11 and 39 in two regions, between the heat sink 9 and the heat spreader plate 12 and the loading mechanism's gimbal 28 and the top heat spreader plate 24. Pyrolytic graphite foil is made up of very highly oriented layers of carbon crystals with the "c" crystallographic axis of the hexagonal crystals perpendicular to the plane of the foil material. Due to the high anisotropy of the crystals, this material is a very effective thermal barrier even in very thin form.

The methodology calculations, data analysis and practice using instruments encompassing the above principles, are described in details in the ASTM E1530 standard, referred to before.

Other aspects of this invention will appear from the following description and appended claims, reference being made to the accompanying drawings forming a part of this specification wherein like reference characters designate corresponding parts in the several views.

Figure 1:
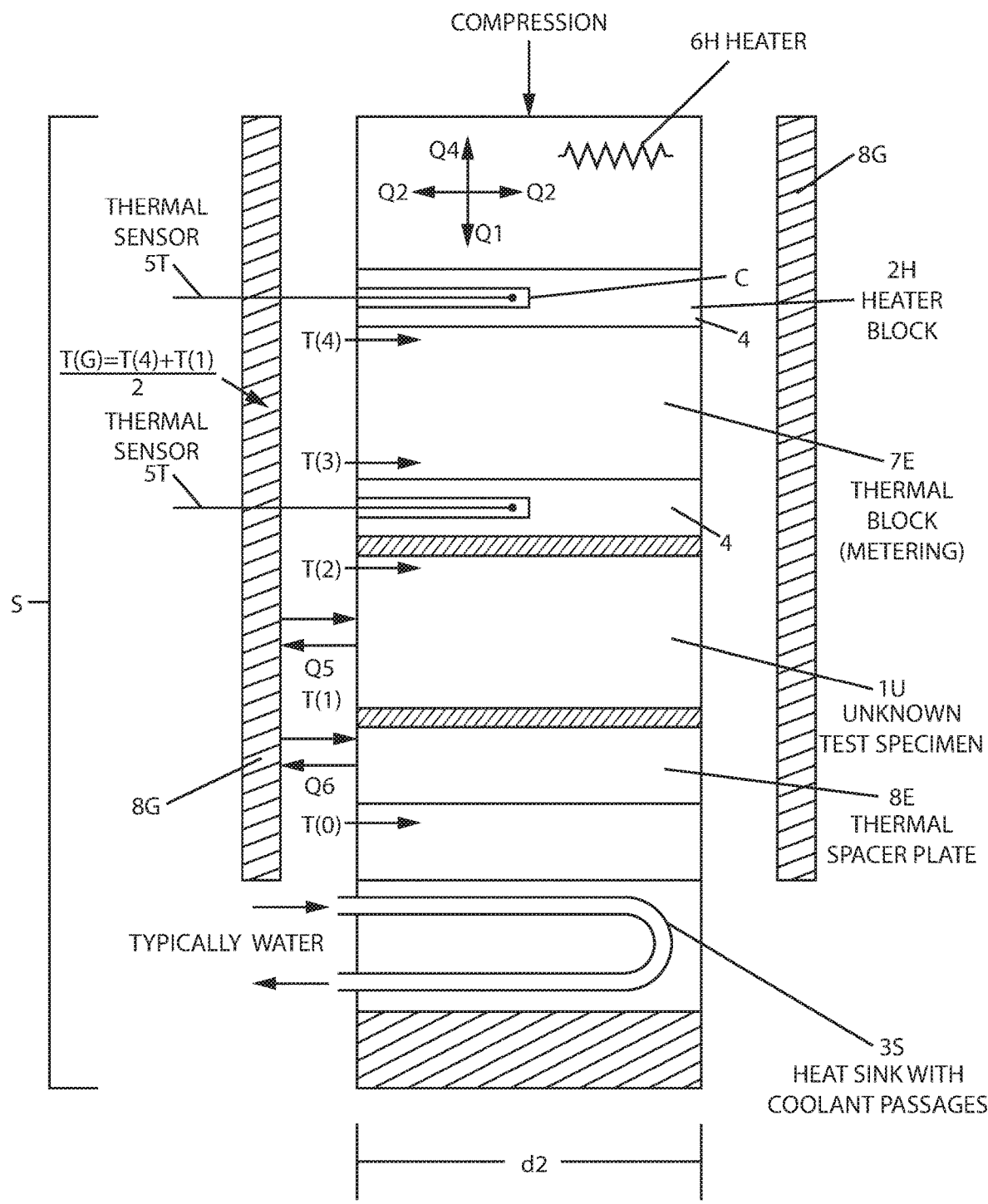
FIG. 1 (prior art) is a sectional view of a Guarded Heat Flow Meter.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE INVENTION

The preferred embodiment of the invention is shown in FIGS. 2 to 5.

The mechanical portion of the device (FIGS. 2 and 3) consists of two columns 1 and 2 standing on a base 3, surrounded by a frame 4 and an anchor plate 5 for the two compression devices 6 and 7. For illustrative purposes, a two column configuration is used, and for a highly conductive heat spreader material copper is indicated.

Each column, circular in cross section in this embodiment, consists of a two part heat sink 8 and 9, fixed to the base 3. Fastened to the heat sink 9 with a number of pyrolytic graphite layers 11 in between, in the thickness ranging up to 1/16 in, is the lower stack assembly LSA.

Figure 3:
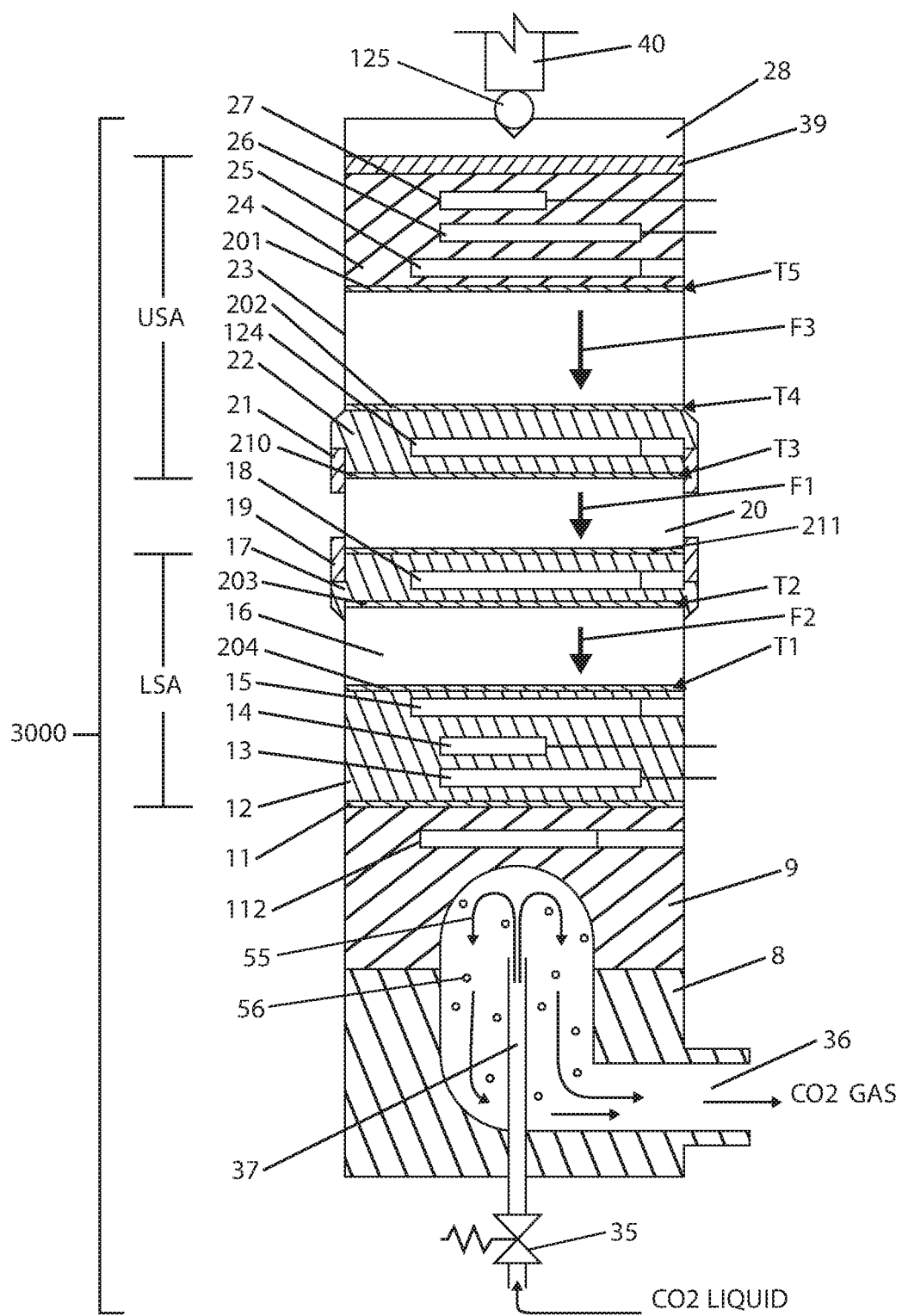
FIG. 3 is a sectional view of the upper and lower stack assemblies.

FIG. 3 shows the lower stack assembly LSA in more details, which consists of a heat spreader copper block 12 with a heater 13 and a control RTD 14 next to it. Close to the top surface, a measuring RTD 15 is placed. Intimately connected (fused, brazed, bonded, etc.) 204 to the copper block 12 is the secondary metering section of a well-characterized material 16, 304 stainless steel in this case, but other suitable materials may suffice. 16 is capped with a heat spreader copper section 17, housing another measuring RTD 18. On top of the heat spreader copper section 17 is a removable guide ring 19. The unknown specimen 20 is thus kept aligned.

The upper stack USA on top of the unknown 20 is similar to the bottom stack LSA, with its sections in reversed order. Guide ring 21 is fastened to the copper heat spreader block 22, which is bonded 202 to the primary reference section 23, capped by the copper heater block 24. Block 24 houses a measuring RTD 25, while 24 also houses heater 26, with its associated control RTD 27.

Since the upper stack is gimbal suspended, it can have a tendency to be misaligned on top of the specimen. The removable rings 19 and 21 provide for the proper seating of the unknown specimen, concentrically with the heat spreader plates 17 and 22. This novel element of the invention alleviates this problem and major source of measurement error. The rings are removable to allow testing thin films.

Figure 4:
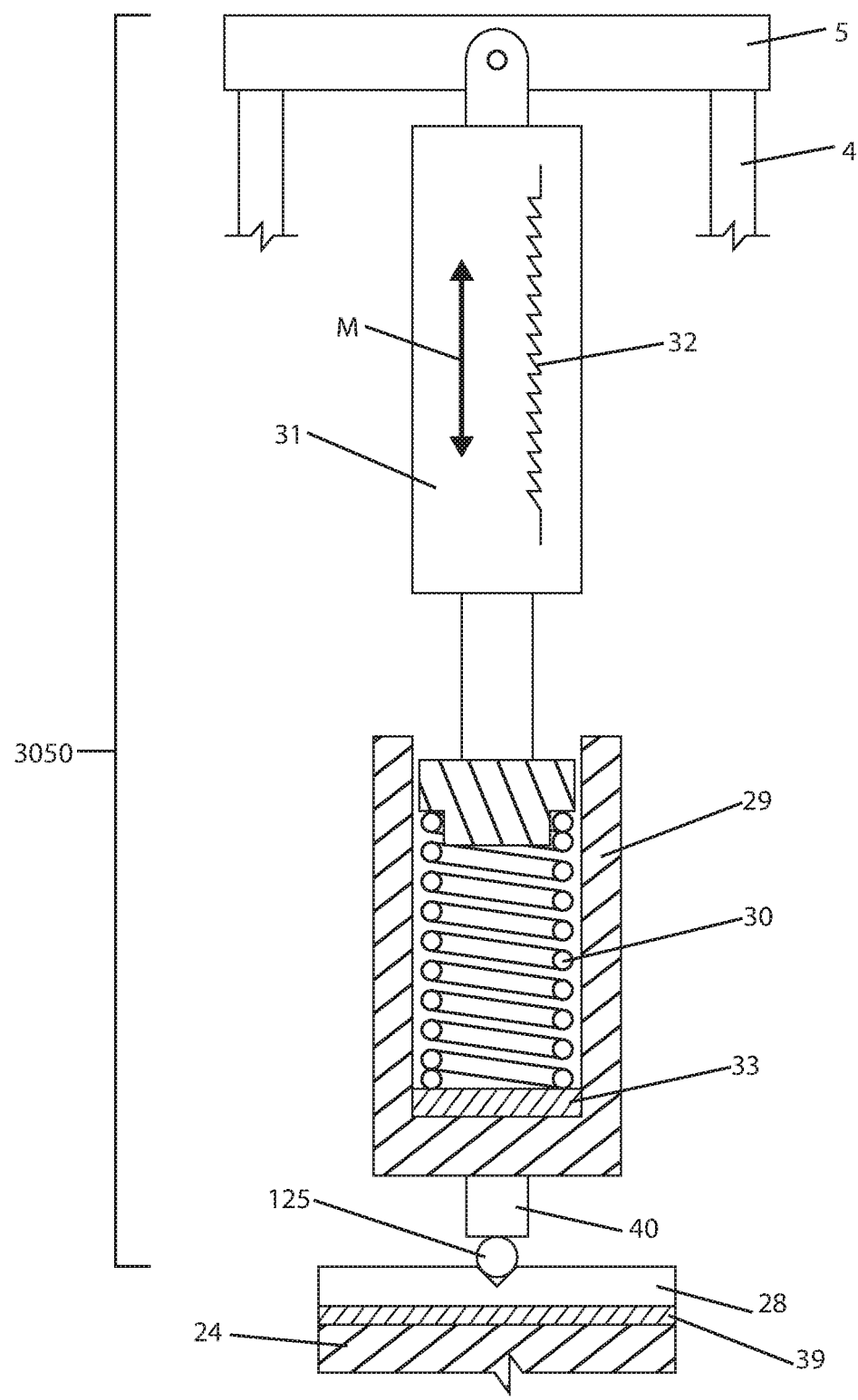
FIG. 4 is a sectional view of the pressure generator.

FIGS. 3,4 shows the gimbal assembly 28, which on one end connects the upper stack heater block 24 and on the other end to the force spring housing 29, which is in turn coupled to the main force spring 30.

Figure 2:
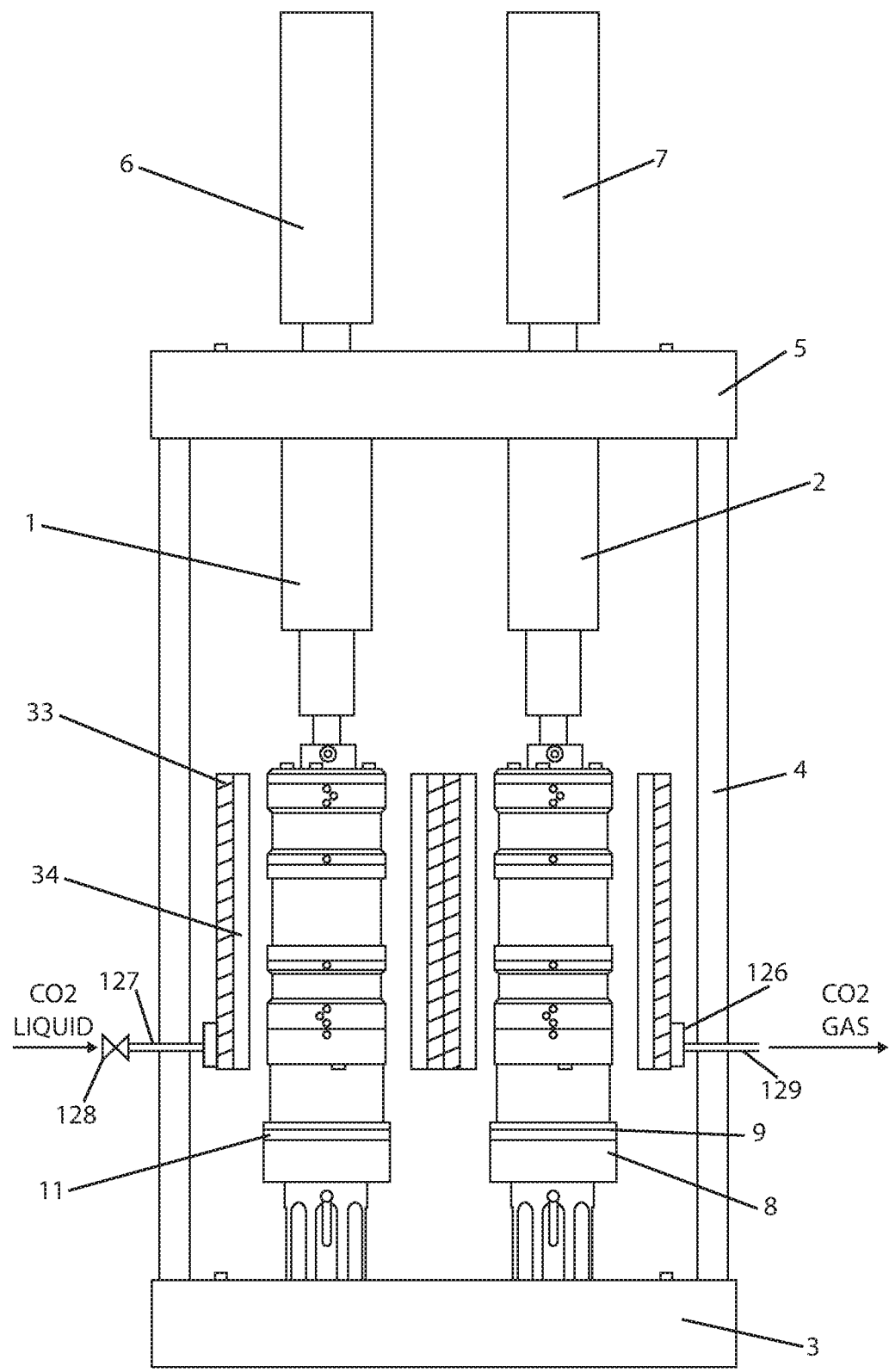
FIG. 2 is a front elevation view of the dual column thermal conductivity instrument.

The present invention employs a novel combination of an electromechanical actuator 31, a linear displacement transducer 32 and a spring 30, to produce the desired compressive force to clamp the specimen 20 between the two heat spreader plates 17 and 22, as illustrated in FIGS. 2 and 3. The operation of this mechanism is controlled by a servo loop including a logical positioning of the electromechanical actuator to a point defined by the feedback signal of the linear displacement transducer, compressing the spring by a known extent. According to Hook's Law, compressing to defined extent a spring of a known spring constant, will take a known force. Conversely, the force exerted on the ends by the same spring will be proportional to its specific compression. Thus, in this fashion, one can readily generate a desired force by controlling the extent of compression of the load spring in FIG. 4. By way of example, a desirable force exerted on a 2 in diameter specimen is 62.8 lbf, to produce 20 psig pressure. This can be accomplished using a 0.625 in diameter, 1.50 in long steel spring, with a spring constant of 151 lb/in. Said spring will produce the desired 62.8 lb at a compression of 0.45 in. This position is determined by tracking the signal from the linear displacement transducer tracking the compression of the spring. An additional force transducer 33 is used as witness to the desired exerted force.

By selecting the compression point on the spring, the clamping pressure on the specimen is selectable within the compression range of the spring. This process allows nearly infinite selection of a fixed point within the capabilities of the spring, or variation of the compressive force according to some functions of time and temperature. In the described embodiment, the spring is coupled to the electromechanical actuator 32, which is anchored to the frame 4 and 5. The stroke of the actuator is tracked with a potentiometer 32, internal to the actuator.

The columns are surrounded by a two cavity guard 33, shown on FIG. 2, with individually temperature controlled thermal shields 34 and position guards.

The flow of LCO2 to the two part 8 and 9 heat sink is through a capillary injector tube 37 and is controlled by a cryogenic rated solenoid valve 35, and the formed $CO_2$ gas is freely exited to the atmosphere through a large exit port 36. The solenoid valve, in turn, is controlled by its own PID controller via the RTD 36. The supply of liquid $CO_2$ from a tank with a syphon tube (not part of the device) is not shown.

A novel feature of the embodiment is the inclusion of very low conductivity thermal barriers in two strategic locations. The first location at 11 is between the heat sink 9 and the lower heater block 12, to damp the thermal oscillation inherent to the periodic liquid $CO_2$ injections into the heat sink. The second location is at 39, between the gimbal plate 28 and top heater block 24, to reduce heat flow from the top heater block to the spring housing extension 40.

Figure 5A:
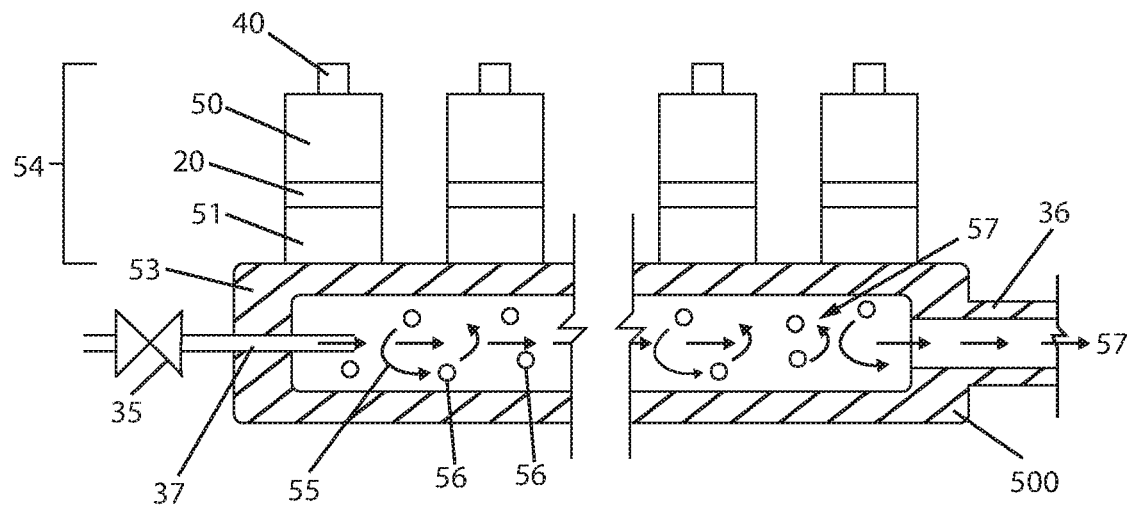
FIG. 5a is a sectional view of an alternate embodiment showing multiple columns using a common heat sink.
Figure 5B:
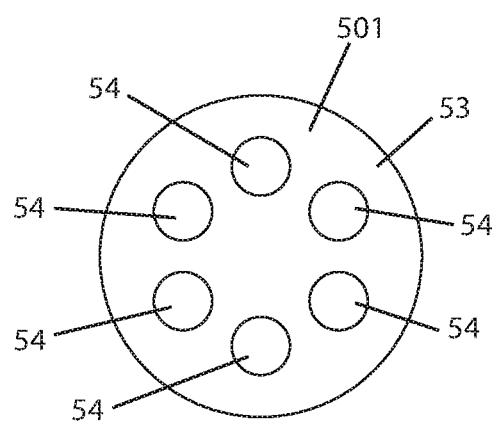
FIG. 5b is a top plan view of a circular embodiment using a common heat sink.
Figure 5C:
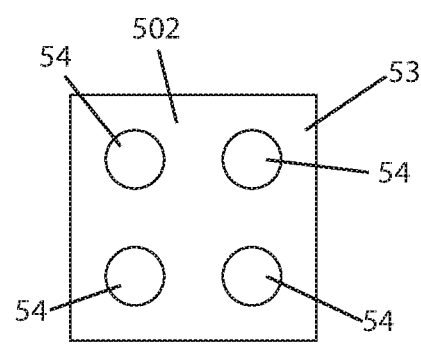
FIG. 5c is a top plan view of a square embodiment using a common heat sink.

Other embodiments of the invention are shown in FIGS. 5a, 5b, 5c. Instead of the previously described two columns, each consisting of an upper stack 50, the unknown 20, and the lower stack 51, more than two columns 54 are placed in contact with a common liquid $CO_2$ cooled heat sink 53. As an example, but not as a limitation, FIG. 5a shows a linear heat sink arrangement 500, while FIG. 5b shows a circular arrangement 501, and FIG. 5c shows a polygonal heat sink arrangement 502. Such common heat sink configurations may be of great benefit in energy and time savings in applications where a large number of specimens are being tested, such as in the case of production control and quality evaluation. In all shown configurations, 40 is the point where clamping force is exerted and 37 is the capillary injection tube for liquid $CO_2$, that is controlled by the solenoid valve 35. The internal cavity 55 exerts on the injected liquid only atmospheric pressure, allowing it to transform first to solid particles 56, and then rapidly sublimate the solid to gas 57, which exits through unrestricted port 36.

Although the present invention has been described with reference to the disclosed embodiments, numerous modifications and variations can be made and still the result will come within the scope of the invention. No limitation with respect to the specific embodiments disclosed herein is intended or should be inferred. Each apparatus embodiment described herein has numerous equivalents.

I claim:

1. A thermal conductivity instrument comprising:
a frame housing an upper compressor for a top of a test stack;
said frame having a base for supporting a bottom of the test stack;
said frame supporting an insulating cavity guard surrounding the test stack;
said test stack further comprising a lower stack having a lowermost liquid CO2 controlled heat sink covered by a first highly conductive block which has a heater and a first temperature sensor covered by a first control material covered by a first highly conductive cap with a second temperature sensor;
an unknown first specimen located on top of the highly conductive cap;
an upper stack on top of the unknown specimen and in contact with the upper compressor;
said upper stack comprising an upper second highly conductive cap over the unknown specimen and having a third temperature sensor;
a second control material covering the upper second highly conductive cap, the second control material covered by a second highly conductive block located over the second control material; and
said second highly conductive block having a heater and a fourth temperature sensor;
wherein thermal conductivity tests from a range of −50'C to 350'C can be done in an uninterrupted manner without using any insulating spacer above the liquid CO2 controlled heat sink.

2. The instrument of claim 1, wherein the compressor further comprises an electro-mechanical actuator compressing a spring.

3. The instrument of claim 1, wherein the insulating cavity guard further comprises a temperature controller and heater.

4. The instrument of claim 1, wherein the first highly conductive block further comprises copper.

5. The instrument of claim 1, wherein the first temperature sensor further comprises a precision resistance thermometer (RTD).

6. The instrument of claim 1, wherein the highly conductive cap further comprises a copper cap.

7. The instrument of claim 1, wherein the second temperature sensor further comprises a RTD.

8. The instrument of claim 1, wherein the upper cap further comprises copper.

9. The instrument of claim 1, wherein the third temperature sensor further comprises a RTD.

10. The instrument of claim 1, wherein the fourth temperature sensor further comprises a RTD.

11. The instrument of claim 1, wherein the second highly conductive block further comprises copper.

12. The instrument of claim 1, further comprising an insulating layer between the first highly conductive block and the liquid CO2 controlled heat sink.

13. The instrument of claim 1, wherein the frame housing further comprises at least two independently controllable test stacks.

14. The instrument of claim 1, further comprising removable guide rings on both the upper and lower stacks, wherein a coaxial alignment between the unknown specimen and the adjoining highly conductive caps is controlled.

15. A thermal conductivity measuring instrument comprising:
an upper compressor for a top of a test stack;
a base for supporting a bottom of the test stack;
an insulating cavity guard surrounding the test stack;
said test stack further comprising a lower stack having a lowermost liquid CO2 controlled heat sink covered by a first highly conductive block which has a first heater and a first temperature sensor, the first heater having a first control temperature sensor;
a first control material located above the first highly conductive block;
a first highly conductive cap having a second temperature sensor and located above the first control material;
an unknown specimen located on top of the first highly conductive cap;
an upper stack on top of the unknown specimen and in contact with the upper compressor;
said upper stack comprising a second highly conductive cap having a third temperature sensor and located above the unknown specimen;
a second control material attached to said second highly conductive cap;
a second highly conductive block over the second control material; and
said second highly conductive block having a second heater and a fourth temperature sensor, the second heater having a second control temperature sensor;
wherein thermal conductivity tests from a range of −50° C. to 350° C. can be done in an uninterrupted manner without using any removable insulating spacer above the liquid CO2 controlled heat sink.

16. The instrument of claim 15, wherein the compressor further comprises an electro-mechanical actuator having a linear displacement transducer compressing a spring.

17. The instrument of claim 15, wherein the first highly conductive cap is located on top of the first control material.

18. The instrument of claim 15, wherein the second highly conductive cap is located on top of the unknown specimen.

19. A multi test stack thermal conductivity measuring instrument comprising:
a plurality of test stacks each sharing a common lower liquid CO2 controlled heat sink;
each test stack having an unknown specimen surrounded by an upper and a lower control material and a plurality of temperature sensors; and
each test stack having an upper compressor.

* * * * *